March 15, 1966 R. H. TURNER 3,240,387
DISPENSING MECHANISM
Filed June 29, 1964

INVENTOR
R. H. Turner
BY
ATTORNEY

United States Patent Office 3,240,387
Patented Mar. 15, 1966

3,240,387
DISPENSING MECHANISM
Robert H. Turner, Bethany, Okla., assignor to Western Electric Company, Incorporated, New York, N.Y., a corporation of New York
Filed June 29, 1964, Ser. No. 378,917
7 Claims. (Cl. 221—243)

This invention relates to a dispensing mechanism, and more particularly to a dispensing mechanism of the type in which articles to be dispensed are fed through a passage and sequentially into a transfer device which receives the articles and transfers them to a dispensing station. It is an object of the invention to provide an improved mechanism of such character.

In dispensing mechanism of the type defined above difficulty is frequently encountered where the transfer device operates at high speed, and where the articles which are to be dispensed are of significantly different lengths, particularly where the articles are relatively fragile. Where the transfer device is operated at high speed, it is subject to substantial vibration when abruptly stopped in position to receive an article from the article feed passage. Accordingly, an article which is partially within the transfer device and partially within the feed passage is subject to breakage. In order to avoid excessive breakage it is common practice either to operate the transfer device at slower speed than desired or to provide increased clearance for the article in the transfer device. In the latter case, the articles may be positioned at the dispensing station with less accuracy than is desired.

Where the articles are of significantly different lengths, breakage will occur upon movement of the transfer device if the article within the transfer device is sufficiently long that it still extends into the feed passage, or if the article within the transfer device is so short that the next following article extends from the feed passage into the transfer device. Excessive breakage from this cause is normally avoided by a compromise measure consisting of providing substantial clearance between the exit end of the feed passage and the adjacent surface of the transfer device. This results in less accurate guiding of the articles in their movement from the feed passage to the transfer device, which, in turn, necessitates increased clearance for the article in the transfer device.

It is another object of the invention to provide an improved dispensing mechanism wherein the transfer device may be operated at high speed without breakage of the articles being dispensed, while providing accurate positioning of the successive articles at the dispensing station.

It is a further object of the invention to provide an improved dispensing mechanism which will accept articles of significantly different lengths for dispensing, and which accurately positions the successive articles at the dispensing station.

Another object of the invention is to provide an improved dispensing mechanism which dispenses accurately and at high speeds articles which are of significantly different lengths.

A further object of the invention is to provide an improved dispensing mechanism having various of the characteristics specified above while being simple in construction, and efficient and reliable in operation.

This invention, together with further objects and advantages thereof, will best be understood by reference to the following description taken in connection with the accompanying drawing, in which:

FIG. 1 is a perspective view of a dispensing mechanism embodying the present invention;

Figure 3:
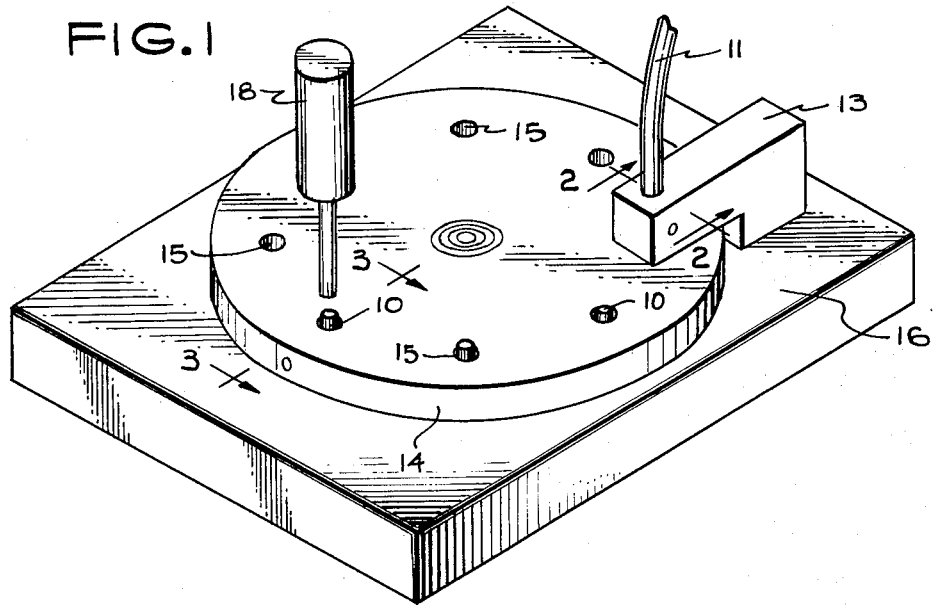
FIG. 3 is a partial, cross-sectional view taken along the line 3—3 of FIG. 1.

The dispensing mechanism illustrated in the drawing is employed for dispensing relatively fragile, rod-shaped articles 10 which are used as spacers in the manufacture of relays. The spacers are fed to the dispensing mechanism through a flexible tube 11 which guides the spacers into a passage 12 in a block 13.

Arranged below the passage-forming end of the block 13 is a rotary disc 14 having openings 11 therein for receiving individual articles 10. The disc 14 is succesively indexed to positions wherein one of the openings 15 is aligned with the passage 12 in the block 13. When the disc is so positioned, an article 10 falls from the passage 12 into the aligned opening 15 in the disc.

An article 10 arranged in any of the openings 15 is supported therein by engagement with the upper surface of a base 16. The leading article 10 within the passage 12 is supported at first by the preceding article arranged within an opening 15 in the disc 14, and subsequently by engagement with the upper surface of the disc 14.

At the actual dispensing station (see FIG. 3) the article 10 is brought into alignment with an opening 17 in the base 16. The article may drop into or through the opening 17 or may be forced down by a suitable plunger 18. It will be appreciated by those skilled in the art that an assembly into which the article 10 is to be inserted may be arranged below the opening 17, successive assemblies being brought to the proper position to receive the successive articles 10, either manually or automatically.

In accordance with the preferred embodiment of the invention, a detent is provided in the base 16 consisting of a ball 19 and a spring 19a. The article 10 is permitted to fall until it engages the ball 19, after which it is thrust downward into an assembly by the plunger 18.

Figure 2:
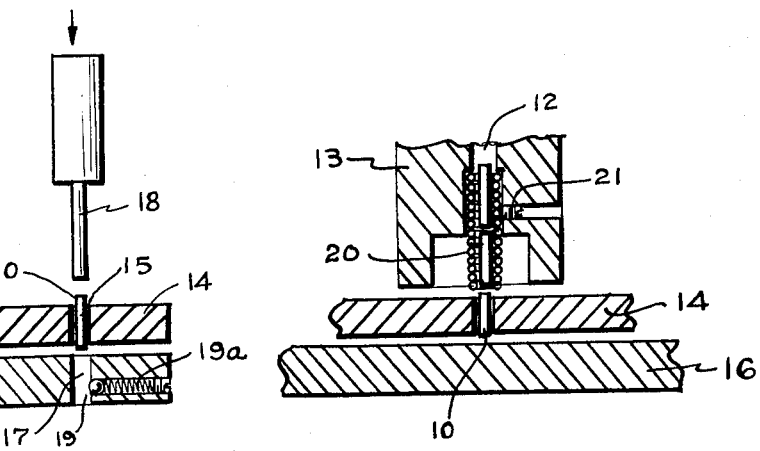
FIG. 2 is a partial, cross-sectional view taken along the line 2—2 of FIG. 1.

Referring again to FIG. 2, it may be seen that the passage 12 in the block 13 is enlarged at its lower end to receive a coil spring 20. This spring is held within the enlarged portion of the passage by a set screw 21.

The inner diameter of the spring 20 is such that the articles 10 may pass freely through the spring while being accurately guided thereby. Preferably, the spring 20 is of the prestressed type wherein the successive turns bear firmly against each other.

The spring 20, which constitutes a laterally resilient portion of the feed passage, substantially eliminates breakage of the articles 10 while permitting accurate guiding of the articles into the openings 15. Accordingly, the openings 15 may be of such size as to receive the articles 10 with only small clearance, such that the articles are accurately positioned at the dispensing station shown in FIG. 3.

It is desired that the transfer device, comprising the rotary disc 14, be indexed rapidly between successive receiving and dispensing positions. The sudden stopping of the disc 14 unavoidably creates vibration of the disc. In a conventional dispensing mechanism, where the lower portion of the feed passage is rigid, an article 10 which has fallen partially into an opening 15 in the disc 14 is subject to breakage as a result of this vibration. On the other hand, the lower end of the spring 20 is readily displaced laterally such that an article 10 which is partially within an opening 15 of the disc 14 and partially within the lower end of the spring 20 is free to follow the vibration of the disc. Breakage from this cause is thus substantially eliminated.

As indicated above, another problem common in dispensing mechanisms of the general type shown in the drawing and described above arises from successive articles being of significantly different lengths. Also as explained above, if the clearance between the lower end of a rigid feed passage and the upper surface of the transfer device does not compensate for the variation in lengths of articles, breakage occurs when an article which is too long or an article which is too short is indexed away from the station shown in FIG. 2. Excessive clearance to compensate for varying lengths of article results in inaccurate guiding of the articles and requires larger openings 15. This, in turn, results in less accurate placement of the article at the dispensing station shown in FIG. 3.

In accordance with the illustrated embodiment of the invention, the lower end of the feed passage (that is, the spring 20) may extend substantially into contact with the upper surface of the transfer device 14. In the event that an article 10 of excessive length is fed into an opening 15 in the disc 14, upon indexing of disc 14 the article merely tilts the lower portion of the spring 20 until the upper end of the article is freed therefrom, after which the spring 20 snaps back into its normal position. If an article 10 which is of less than normal length enters an opening in the disc 14, the next succeeding article will extend a short distance into the opening 15. Again, upon indexing of the disc 14, the lower portion of the spring yields until the next succeeding article is freed from the opening 15, after which the spring 20 snaps back to its normal position.

Since the spring 20 is thus permitted to extend downward to a position substantially contacting the upper surface of the disc 14 the articles are accurately guided, and the openings 15 in the disc 14 may be of such size as to receive the articles 10 with little clearance. The articles are thus positioned accurately at the dispensing station shown in FIG. 3.

A dispensing mechanism has now been shown and described which permits accurate positioning at the dispensing station of the articles to be dispensed in spite of significant difference in the lengths of the articles and in spite of vibration which inherently attends rapid operation of the mechanism.

Where reference is made herein to variations in the length of the articles to be dispensed, reference is, of course, intended to the dimension of the article which is critical to the dispensing operation, whether or not this is the greatest dimension of the article.

In the illustrated embodiment of the invention, the transfer device consists of a disc which is rotatably indexed in one direction. As will be apparent to those skilled in the art, the invention is equally applicable to an oscillatory transfer device which moves along either an arcuate path or a straight path. In accordance with the illustrated and preferred embodiment of the invention, the lower end of the feed passage is made laterally resilient through the use of the spring 20. It will be apparent that various materials might be employed, in place of the spring 20, to provide the desired degree of lateral resilience.

While various embodiments of the invention have been disclosed, many modifications will be apparent, and it is intended that the invention be interpreted as including all modifications which fall within the true spirit and scope of the invention.

What is claimed is:

1. In a dispensing mechanism having means defining an elongated passage for the sequential feeding of articles to be dispensed, and a transfer device for receiving articles sequentially from said passage defining means and for transferring the articles to be a dispensing station, the improvement comprising:
   a stationary member provided with a bore therethrough, said bore forming a portion of said passage near the terminating and thereof; and
   a laterally resilient section of tubing forming the terminating end portion of said passage, an upper end of said resilient tubing being affixed to said member in axial alignment with the bore therethrough, and at least a lower end section of said tubing extending in free-space relationship from the lower terminating end of said bore, with the free end of said tubing positioned closely adjacent said transfer device.

2. The improvement in a dispensing mechanism as specified in claim 1 wherein said laterally resilient section of tubing comprises a coil spring.

3. The improvement in a dispensing mechanism as specified in claim 1 wherein said block has a recess in the lower surface thereof considerably larger than the cross-sectional area of said resilient tubing and of a depth into said member substantially equal to the length of the lowermost free-space end section of said tubing, said recess thereby allowing lateral displacement of the free end of said tubing confined therewithin.

4. In a dispensing mechanism having means defining an elongated passage for the sequential feeding of articles to be dispensed, and a transfer device for receiving articles sequentially from said passage defining means and for transferring the articles to a dispensing station, the improvement comprising:
   a stationary member provided with a bore therethrough and with a recess of larger cross-sectional area than said bore, said recess extending a predetermined distance into said member from the lower terminating end of said bore, said bore also having a lower section of larger diameter than an upper section thereof, said upper section forming a portion of said passage near the terminating end thereof; and
   a laterally resilient length of coil spring forming the terminating end portion of said passage, said lower section of said bore in said member accommodating and providing support for an upper section of said coil spring, a lower end section of said coil spring extending approximately said predetermined distance in free-space relationship from the lower terminating end of said bore and being substantially confined but laterally displaceable within the recess of said member.

5. A dispensing mechanism for feeding articles initially to a transfer station and subsequently to a dispensing station comprising:
   article dispensing means positioned at a dispensing station;
   a transfer device for receiving articles fed thereto and transferring them to said dispensing station; and
   means defining a passage for sequentially feeding said articles to be dispensed initially to said transfer device, said passage defining means including:
   a stationary member provided with a bore therethrough, said bore forming a portion of said passage near the terminating end thereof; and
   a laterally resilient section of tubing forming the terminating end portion of said passage, an upper end of said resilient tubing being secured to said member in axial alignment with the bore therethrough, and at least a lower end section of said tubing extending in free-space relationship from the lower terminating end of said bore, with the free end of said tubing being positioned closely adjacent said transfer device.

6. A dispensing mechanism in accordance with claim 5 wherein said laterally resilient section of tubing comprises a coil spring.

7. A dispensing mechanism in accordance with claim 6 wherein the bore of said member has a lower section of larger diameter than an upper section thereof to accommodate and provide support for an upper section of said coil spring, and wherein said member also has a recess in the lwer surface thereof considerably larger than the diameter of said coil spring and of a depth into said block substantially equal to the length of the lowermost end section of said coil spring, said recess thereby allowing lateral displacement of the free end of said coil spring confined substantially therewithin.

References Cited by the Examiner

UNITED STATES PATENTS

| | | | |
|---|---|---|---|
| 867,834 | 10/1907 | Neureuther | 221—234 |
| 1,052,092 | 2/1913 | Robertson | 221—243 |
| 1,842,452 | 1/1932 | Jacobson et al. | 221—267 |
| 2,523,278 | 9/1950 | Carl | 221—267 |
| 2,553,095 | 5/1951 | Jones | 221—265 |
| 2,610,453 | 9/1952 | White | 267—73 |
| 2,745,571 | 5/1956 | Roy | 221—243 |
| 2,792,922 | 5/1957 | Malhiot | 221—243 |
| 3,011,678 | 12/1961 | McClosky et al. | 221—233 |

LOUIS J. DEMBO, *Primary Examiner.*

WALTER SOBIN, *Examiner.*